US009323577B2

(12) United States Patent
Marr et al.

(10) Patent No.: US 9,323,577 B2
(45) Date of Patent: Apr. 26, 2016

(54) AUTOMATED PROFILING OF RESOURCE USAGE

(71) Applicants: Michael David Marr, Monroe, WA (US); Matthew D. Klein, Seattle, WA (US)

(72) Inventors: Michael David Marr, Monroe, WA (US); Matthew D. Klein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 763 days.

(21) Appl. No.: 13/623,845

(22) Filed: Sep. 20, 2012

(65) Prior Publication Data
US 2014/0082165 A1 Mar. 20, 2014

(51) Int. Cl.
*G06F 15/177* (2006.01)
*G06F 9/50* (2006.01)

(52) U.S. Cl.
CPC .................................. *G06F 9/5044* (2013.01)

(58) Field of Classification Search
CPC ............................... H04L 47/70; G06F 9/455
USPC .......... 709/222, 223, 224, 227; 718/101, 104, 718/105
See application file for complete search history.

(56) References Cited

U.S. PATENT DOCUMENTS

| 5,063,500 A | 11/1991 | Shorter |
| 5,341,477 A | 8/1994 | Pitkin et al. |
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |

(Continued)

FOREIGN PATENT DOCUMENTS

| CA | 2741 895 A1 | 5/2010 |
| CN | 1422468 A | 6/2003 |

(Continued)

OTHER PUBLICATIONS

"Secure In-VM Monitoring Using Hardware Virtualization"—Sharif et al, Microsoft, Oct. 2009 http://research.microsoft.com/pubs/153179/sim-ccs09.pdf.*

(Continued)

*Primary Examiner* — Randy Scott
(74) *Attorney, Agent, or Firm* — Knobbe Martens Olson & Bear LLP

(57) ABSTRACT

Operating profiles for consumers of computing resources may be automatically determined based on an analysis of actual resource usage measurements and other operating metrics. Measurements may be taken while a consumer, such as a virtual machine instance, uses computing resources, such as those provided by a host. A profile may be dynamically determined based on those measurements. Profiles may be generalized such that groups of consumers with similar usage profiles are associated with a single profile. Assignment decisions may be made based on the profiles, and computing resources may be reallocated or oversubscribed if the profiles indicate that the consumers are unlikely to fully utilize the resources reserved for them. Oversubscribed resources may be monitored, and consumers may be transferred to different resource providers if contention for resources is too high.

29 Claims, 8 Drawing Sheets

(56) References Cited

U.S. PATENT DOCUMENTS

| | | | |
|---|---|---|---|
| 5,933,811 | A | 8/1999 | Angles et al. |
| 5,937,427 | A | 8/1999 | Shinagawa et al. |
| 5,974,454 | A | 10/1999 | Apfel et al. |
| 5,991,306 | A | 11/1999 | Burns et al. |
| 6,016,512 | A | 1/2000 | Huitema |
| 6,026,452 | A | 2/2000 | Pitts |
| 6,038,601 | A | 3/2000 | Lambert et al. |
| 6,052,718 | A | 4/2000 | Gifford |
| 6,078,960 | A | 6/2000 | Ballard |
| 6,085,234 | A | 7/2000 | Pitts et al. |
| 6,092,100 | A | 7/2000 | Berstis et al. |
| 6,098,096 | A | 8/2000 | Tsirigotis et al. |
| 6,108,703 | A | 8/2000 | Leighton et al. |
| 6,128,279 | A | 10/2000 | O'Neil et al. |
| 6,157,942 | A | 12/2000 | Chu et al. |
| 6,167,438 | A | 12/2000 | Yates et al. |
| 6,167,446 | A | 12/2000 | Lister et al. |
| 6,182,111 | B1 | 1/2001 | Inohara et al. |
| 6,182,125 | B1 | 1/2001 | Borella et al. |
| 6,185,598 | B1 | 2/2001 | Farber et al. |
| 6,192,051 | B1 | 2/2001 | Lipman et al. |
| 6,205,475 | B1 | 3/2001 | Pitts |
| 6,223,288 | B1 | 4/2001 | Byrne |
| 6,243,761 | B1 | 6/2001 | Mogul et al. |
| 6,275,496 | B1 | 8/2001 | Burns et al. |
| 6,286,043 | B1 | 9/2001 | Cuomo et al. |
| 6,286,084 | B1 | 9/2001 | Wexler et al. |
| 6,304,913 | B1 | 10/2001 | Rune |
| 6,324,580 | B1 | 11/2001 | Jindal et al. |
| 6,330,602 | B1 | 12/2001 | Law et al. |
| 6,338,082 | B1 | 1/2002 | Schneider |
| 6,345,308 | B1 | 2/2002 | Abe |
| 6,351,743 | B1 | 2/2002 | DeArdo et al. |
| 6,351,775 | B1 | 2/2002 | Yu |
| 6,363,411 | B1 | 3/2002 | Dugan et al. |
| 6,366,952 | B2 | 4/2002 | Pitts |
| 6,374,290 | B1 | 4/2002 | Scharber et al. |
| 6,377,257 | B1 | 4/2002 | Borrel et al. |
| 6,386,043 | B1 | 5/2002 | Millins |
| 6,405,252 | B1 | 6/2002 | Gupta et al. |
| 6,408,360 | B1 | 6/2002 | Chamberlain et al. |
| 6,411,967 | B1 | 6/2002 | Van Renesse |
| 6,415,280 | B1 | 7/2002 | Farber et al. |
| 6,430,607 | B1 | 8/2002 | Kavner |
| 6,438,592 | B1 | 8/2002 | Killian |
| 6,442,165 | B1 | 8/2002 | Sitaraman et al. |
| 6,452,925 | B1 | 9/2002 | Sistanizadeh et al. |
| 6,457,047 | B1 | 9/2002 | Chandra et al. |
| 6,459,909 | B1 | 10/2002 | Bilcliff et al. |
| 6,473,804 | B1 | 10/2002 | Kaiser et al. |
| 6,484,143 | B1 | 11/2002 | Swildens et al. |
| 6,505,241 | B2 | 1/2003 | Pitts |
| 6,523,036 | B1 | 2/2003 | Hickman et al. |
| 6,529,910 | B1 | 3/2003 | Fleskes |
| 6,529,953 | B1 | 3/2003 | Van Renesse |
| 6,553,413 | B1 | 4/2003 | Leighton et al. |
| 6,560,610 | B1 | 5/2003 | Eatherton et al. |
| 6,611,873 | B1 | 8/2003 | Kanehara |
| 6,643,357 | B2 | 11/2003 | Lumsden |
| 6,643,707 | B1 | 11/2003 | Booth |
| 6,654,807 | B2 | 11/2003 | Farber et al. |
| 6,658,462 | B1 | 12/2003 | Dutta |
| 6,665,706 | B2 | 12/2003 | Kenner et al. |
| 6,678,717 | B1 | 1/2004 | Schneider |
| 6,678,791 | B1 | 1/2004 | Jacobs et al. |
| 6,681,282 | B1 | 1/2004 | Golden et al. |
| 6,694,358 | B1 | 2/2004 | Swildens et al. |
| 6,697,805 | B1 | 2/2004 | Choquier et al. |
| 6,724,770 | B1 | 4/2004 | Van Renesse |
| 6,732,237 | B1 | 5/2004 | Jacobs et al. |
| 6,754,699 | B2 | 6/2004 | Swildens et al. |
| 6,754,706 | B1 | 6/2004 | Swildens et al. |
| 6,760,721 | B1 | 7/2004 | Chasen et al. |
| 6,769,031 | B1 | 7/2004 | Bero |
| 6,782,398 | B1 | 8/2004 | Bahl |
| 6,785,704 | B1 | 8/2004 | McCanne |
| 6,795,434 | B1 | 9/2004 | Kumar et al. |
| 6,799,214 | B1 | 9/2004 | Li |
| 6,804,706 | B2 | 10/2004 | Pitts |
| 6,810,291 | B2 | 10/2004 | Card et al. |
| 6,810,411 | B1 | 10/2004 | Coughlin et al. |
| 6,829,654 | B1 | 12/2004 | Jungck |
| 6,862,607 | B1 | 3/2005 | Vermeulen |
| 6,874,017 | B1 | 3/2005 | Inoue et al. |
| 6,917,951 | B2 | 7/2005 | Orbits et al. |
| 6,928,467 | B2 | 8/2005 | Peng |
| 6,928,485 | B1 | 8/2005 | Krishnamurthy et al. |
| 6,941,562 | B2 | 9/2005 | Gao et al. |
| 6,963,850 | B1 | 11/2005 | Bezos et al. |
| 6,976,090 | B2 | 12/2005 | Ben-Shaul et al. |
| 6,981,017 | B1 | 12/2005 | Kasriel et al. |
| 6,985,945 | B2 | 1/2006 | Farhat et al. |
| 6,986,018 | B2 | 1/2006 | O'Rourke et al. |
| 6,990,526 | B1 | 1/2006 | Zhu |
| 6,996,616 | B1 | 2/2006 | Leighton et al. |
| 7,003,555 | B1 | 2/2006 | Jungck |
| 7,006,099 | B2 | 2/2006 | Gut et al. |
| 7,007,089 | B2 | 2/2006 | Freedman |
| 7,010,578 | B1 | 3/2006 | Lewin et al. |
| 7,010,598 | B2 | 3/2006 | Sitaraman et al. |
| 7,024,466 | B2 | 4/2006 | Outten et al. |
| 7,031,445 | B2 | 4/2006 | Lumsden |
| 7,032,010 | B1 | 4/2006 | Swildens et al. |
| 7,058,706 | B1 | 6/2006 | Iyer et al. |
| 7,058,953 | B2 | 6/2006 | Willard et al. |
| 7,065,587 | B2 | 6/2006 | Huitema et al. |
| 7,072,982 | B2 | 7/2006 | Teodosiu et al. |
| 7,076,633 | B2 | 7/2006 | Tormasov et al. |
| 7,082,476 | B1 | 7/2006 | Cohen et al. |
| 7,086,061 | B1 | 8/2006 | Joshi et al. |
| 7,092,505 | B2 | 8/2006 | Allison et al. |
| 7,092,997 | B1 | 8/2006 | Kasriel et al. |
| 7,096,266 | B2 | 8/2006 | Lewin et al. |
| 7,099,936 | B2 | 8/2006 | Chase et al. |
| 7,103,645 | B2 | 9/2006 | Leighton et al. |
| 7,114,160 | B2 | 9/2006 | Suryanarayana et al. |
| 7,117,262 | B2 | 10/2006 | Bai et al. |
| 7,133,905 | B2 | 11/2006 | Dilley et al. |
| 7,136,922 | B2 | 11/2006 | Sundaram et al. |
| 7,139,821 | B1 | 11/2006 | Shah et al. |
| 7,143,169 | B1 | 11/2006 | Champagne et al. |
| 7,143,170 | B2 | 11/2006 | Swildens et al. |
| 7,146,560 | B2 | 12/2006 | Dang et al. |
| 7,149,809 | B2 | 12/2006 | Barde et al. |
| 7,152,118 | B2 | 12/2006 | Anderson, IV et al. |
| 7,162,539 | B2 | 1/2007 | Garcie-Luna-Aceves |
| 7,174,382 | B2 | 2/2007 | Ramanathan et al. |
| 7,185,063 | B1 | 2/2007 | Kasriel et al. |
| 7,185,084 | B2 | 2/2007 | Sirivara et al. |
| 7,188,214 | B1 | 3/2007 | Kasriel et al. |
| 7,194,522 | B1 | 3/2007 | Swildens et al. |
| 7,194,552 | B1 | 3/2007 | Schneider |
| 7,200,667 | B2 | 4/2007 | Teodosiu et al. |
| 7,216,170 | B2 | 5/2007 | Ludvig et al. |
| 7,225,254 | B1 | 5/2007 | Swildens et al. |
| 7,228,350 | B2 | 6/2007 | Hong et al. |
| 7,228,359 | B1 | 6/2007 | Monteiro |
| 7,233,978 | B2 | 6/2007 | Overton et al. |
| 7,240,100 | B1 | 7/2007 | Wein et al. |
| 7,251,675 | B1 | 7/2007 | Kamakura et al. |
| 7,254,626 | B1 | 8/2007 | Kommula et al. |
| 7,254,636 | B1 | 8/2007 | O'Toole, Jr. et al. |
| 7,257,581 | B1 | 8/2007 | Steele et al. |
| 7,260,598 | B1 | 8/2007 | Liskov et al. |
| 7,260,639 | B2 | 8/2007 | Afergan et al. |
| 7,269,784 | B1 | 9/2007 | Kasriel et al. |
| 7,274,658 | B2 | 9/2007 | Bornstein et al. |
| 7,284,056 | B2 | 10/2007 | Ramig |
| 7,289,519 | B1 | 10/2007 | Liskov |
| 7,293,093 | B2 | 11/2007 | Leighton |
| 7,308,499 | B2 | 12/2007 | Chavez |
| 7,310,686 | B2 | 12/2007 | Uysal |
| 7,316,648 | B2 | 1/2008 | Kelly et al. |
| 7,318,074 | B2 | 1/2008 | Iyengar et al. |

(56) References Cited

U.S. PATENT DOCUMENTS

| | | |
|---|---|---|
| 7,320,131 B1 | 1/2008 | O'Toole, Jr. |
| 7,321,918 B2 | 1/2008 | Burd et al. |
| 7,339,937 B2 | 3/2008 | Mitra et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,430,610 B2 | 9/2008 | Pace et al. |
| 7,441,045 B2 | 10/2008 | Skene et al. |
| 7,441,261 B2 | 10/2008 | Slater et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,685,251 B2 | 3/2010 | Houlihan et al. |
| 7,693,813 B1 | 4/2010 | Cao et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlstedt et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,156,199 B1 | 4/2012 | Hoche-Mong et al. |
| 8,156,243 B2 | 4/2012 | Richardson et al. |
| 8,175,863 B1* | 5/2012 | Ostermeyer ........ G06F 17/5009 703/13 |
| 8,190,682 B2 | 5/2012 | Paterson-Jones et al. |
| 8,195,837 B2 | 6/2012 | McCarthy et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,380,831 B2 | 2/2013 | Barber |
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |

(56) References Cited

U.S. PATENT DOCUMENTS

| | | |
|---|---|---|
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,908 B2 | 8/2013 | Holmes et al. |
| 8,526,405 B2 | 9/2013 | Curtis et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,756,322 B1 * | 6/2014 | Lynch ............................ 709/226 |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 | 2/2015 | Shah |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,130,756 B2 | 9/2015 | Richardson et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |
| 9,191,458 B2 | 11/2015 | Richardson et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0198953 A1 | 12/2002 | O'Rourke et al. |
| 2003/0002484 A1 | 1/2003 | Freedman |
| 2003/0007482 A1 | 1/2003 | Khello et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0041094 A1 | 2/2003 | Lara et al. |
| 2003/0065739 A1 | 4/2003 | Shnier |
| 2003/0074401 A1 | 4/2003 | Connell et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0112792 A1 | 6/2003 | Cranor et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |

(56) References Cited

U.S. PATENT DOCUMENTS

| | | |
|---|---|---|
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010563 A1 | 1/2004 | Forte et al. |
| 2004/0010588 A1 | 1/2004 | Slater et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0157712 A1 | 7/2005 | Rangarajan et al. |
| 2005/0160133 A1* | 7/2005 | Greenlee et al. ............ 709/200 |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |

(56) References Cited

U.S. PATENT DOCUMENTS

| | | |
|---|---|---|
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086574 A1 | 4/2008 | Raciborski et al. |
| 2008/0092242 A1 | 4/2008 | Rowley |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |

(56) References Cited

U.S. PATENT DOCUMENTS

| | | |
|---|---|---|
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 12/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0010244 A1 | 1/2011 | Hatridge |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0055921 A1 | 3/2011 | Narayanaswamy et al. |
| 2011/0058675 A1 | 3/2011 | Brueck et al. |
| 2011/0072138 A1* | 3/2011 | Canturk ............. G06F 9/5011 709/226 |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0161461 A1 | 6/2011 | Niven-Jenkins |
| 2011/0166935 A1 | 7/2011 | Armentrout et al. |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0011190 A1 | 1/2012 | Driesen et al. |
| 2012/0036238 A1 | 2/2012 | Sundaram et al. |
| 2012/0066360 A1 | 3/2012 | Ghosh |
| 2012/0079115 A1 | 3/2012 | Richardson et al. |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0143688 A1 | 6/2012 | Alexander |
| 2012/0159476 A1* | 6/2012 | Ramteke et al. .................. 718/1 |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0019311 A1 | 1/2013 | Swildens et al. |
| 2013/0041872 A1 | 2/2013 | Aizman et al. |
| 2013/0046869 A1 | 2/2013 | Jenkins et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0305046 A1 | 11/2013 | Mankovski et al. |
| 2013/0311605 A1 | 11/2013 | Richardson et al. |
| 2013/0339429 A1 | 12/2013 | Richardson et al. |
| 2013/0346567 A1 | 12/2013 | Richardson et al. |
| 2014/0007239 A1 | 1/2014 | Sharpe et al. |
| 2014/0019605 A1 | 1/2014 | Boberg |
| 2014/0036675 A1* | 2/2014 | Wang ....................... G06F 9/52 370/235 |
| 2014/0040478 A1 | 2/2014 | Hsu et al. |
| 2014/0053022 A1 | 2/2014 | Forgette et al. |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0137111 A1 | 5/2014 | Dees et al. |
| 2014/0143320 A1 | 5/2014 | Sivasubramanian et al. |
| 2014/0165061 A1 | 6/2014 | Greene et al. |
| 2014/0257891 A1 | 9/2014 | Richardson et al. |

(56) References Cited

U.S. PATENT DOCUMENTS

| | | |
|---|---|---|
| 2014/0297870 A1 | 10/2014 | Eggleston et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188994 A1 | 7/2015 | Marshall et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0229710 A1 | 8/2015 | Sivasubramanian et al. |
| 2015/0249579 A1 | 9/2015 | Ellsworth et al. |
| 2015/0256647 A1 | 9/2015 | Richardson et al. |
| 2015/0319194 A1 | 11/2015 | Richardson et al. |
| 2015/0319260 A1 | 11/2015 | Watson |
| 2015/0334082 A1 | 11/2015 | Richardson et al. |

FOREIGN PATENT DOCUMENTS

| | | |
|---|---|---|
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| JP | 2001-506093 | 5/2001 |
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003-188901 A | 7/2003 |
| JP | 2003-522358 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-509623 | 4/2012 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |

OTHER PUBLICATIONS

"Non-Final Office Action dated Jan. 3, 2012," U.S. Appl. No. 12/652,541; Jan. 3, 2012; 35 pages.
"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index. php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates Ultra SPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid: 863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implemen-

(56) References Cited

OTHER PUBLICATIONS tation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes", May 2005, In Proc. of Networking 2005, all pages.
Gunther et al, "Measuring Round Trip Times to determine the Distance between WLAN Nodes", Dec. 18, 2004, Technical University Berlin, all pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, mailed Oct. 12, 2011 in 11 pages.
Supplementary European Search Report in Application No. 09727694.3 mailed Jan. 30, 2012 in 6 pages.
Singapore Examination Report in Application No. 201006837-7 mailed Mar. 16, 2012.
First Office Action in Chinese Application No. 200980111426.1 mailed Feb. 16, 2013.
Second Office Action in Chinese Application No. 200980111426.1 mailed Dec. 25, 2013.
Third Office Action in Chinese Application No. 200980111426.1 mailed Jul. 7, 2014.
Fourth Office Action in Chinese Application No. 200980111426.1 mailed Jan. 15, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, mailed Oct. 12, 2011 in 10 pages.
First Office Action in Japanese Application No. 2011-502140 mailed Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.

(56) References Cited

OTHER PUBLICATIONS

Search Report for European Application No. 09839809.2 dated May 11, 2015.
Supplementary European Search Report in Application No. 09728756.9 mailed Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 mailed on Oct. 12, 2011.
First Office Action is Chinese Application No. 200980125551.8 mailed Jul. 4, 2012.
First Office Action in Japanese Application No. 2011-516466 mailed Mar. 6, 2013.
Second Office Action in Japanese Application No. 2011-516466 mailed Mar. 17, 2014.
Decision of Refusal in Japanese Application No. 2011-516466 mailed Jan. 16, 2015.
Office Action in Canadian Application No. 2726915 dated May 13, 2013.
First Office Action in Korean Application No. 10-2011-7002461 mailed May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 mailed Nov. 19, 2012.
Examination Report in Singapore Application No. 201103333-9 dated Aug. 13, 2013.
International Search Report and Written Opinion in PCT/US2011/053302 mailed Nov. 28, 2011 in 11 pages.
International Preliminary Report on Patentability in PCT/US2011/053302 mailed Apr. 2, 2013.
First Office Action in Japanese Application No. 2013-529454 mailed Feb. 3, 2014 in 6 pages.
Office Action in Japanese Application No. 2013-529454 mailed Mar. 9, 2015 in 8 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
First Office Action in Chinese Application No. 201180046104.0 mailed Nov. 3, 2014.
Examination Report in Singapore Application No. 201301573-0 mailed Dec. 22, 2014.
International Preliminary Report on Patentability in PCT/US2011/061486 mailed May 22, 2013.
International Search Report and Written Opinion in PCT/US2011/061486 mailed Mar. 30, 2012 in 11 pages.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 mailed Dec. 11, 2012 in 26 pages.
Office Action in Japanese Application No. 2013-123086 mailed Apr. 15, 2014 in 3 pages.
Office Action in Japanese Application No. 2013-123086 mailed Dec. 2, 2014 in 2 pages.
Horvath et al., Enhancing Energy Efficiency in Multi-tier Web Server Clusters via Prioritization, in Parallel and Distributed Processing Symposium, 2007. IPDPS 2007. IEEE International , pp. 1-6, Mar. 26-30, 2007.
Kenshi, P., Help File Library: Iptables Basics, Justlinux, retrieved Dec. 1, 2005, from http://www.justlinux.com/nhf/Security/Iptables_Basics.html, 4 pages.
Fifth Office Action received in Chinese Application No. 200980111426.1 mailed Aug. 14, 2015.
Office Action received in Japanese Application No. 2011-502139 dated Aug. 17, 2015.
Office Action received in Japanese Application No. 2014-225580 dated Oct. 26, 2015.
Second Office Action received in Chinese Application No. 201180046104.0 mailed Sep. 29, 2015.
Office Action received in Canadian Application No. 2816612 dated Nov. 3, 2015.

* cited by examiner

AUTOMATED PROFILING OF RESOURCE USAGE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical host computing device to host one or more instances of virtual machine instance configurations that appear and operate as independent computing devices to users of a data center. With virtualization, the single physical host computing device can create, maintain, delete, or otherwise manage virtual machine instances in a dynamic manner. In turn, users can request single computing devices or a configuration of networked computing devices, and be provided with varying numbers of virtual machine resources.

The computing resources provided by the host computing devices may include computing capacity, memory and other storage, bandwidth, and the like. In a data center environment with thousands of host computing devices, an instance of a virtual machine may be instantiated on a random host computing device so long as the target host computing device meets specified criteria such as sufficient and available computing device resources (e.g., processing units, memory, and the like). Once an instance of a virtual machine is instantiated on a physical host computing device, a predetermined amount of one or more computing resources may be reserved for use by the virtual machine instance. A computing resource provider or other operator of the data center environment may guarantee availability, to the virtual machine instance, of the reserved amounts of computing resources on the target computing device.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
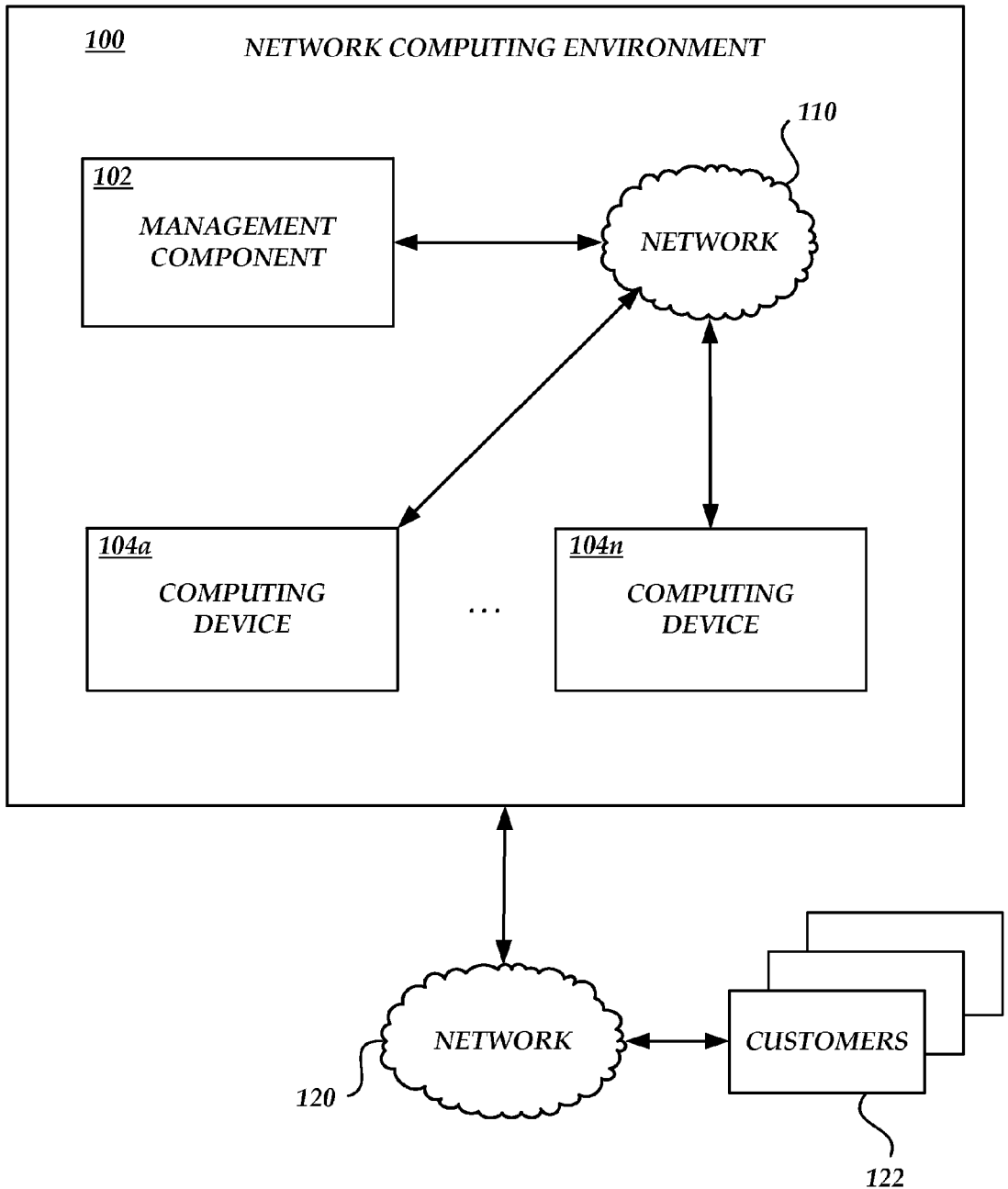
FIG. 1 is a block diagram of an illustrative network computing environment including a management component, multiple host computing devices, and multiple customers.

Generally described, the present disclosure relates to computing resource utilization. Specifically, the disclosure relates to automatically determining resource usage and operating metric profiles for consumers of computing resources based on an analysis of actual resource usage measurements and other operating metrics. In some embodiments, a consumer of computing resources, such as an instance of a virtual machine instantiated according to customer specifications (e.g.: a virtual machine instance instantiated from a virtual machine image configured with an operating system and application software according to customer specifications), may be instantiated on a host physical computing device. The virtual machine instance may consume various computing resources based on the execution of one or more computer software programs or other workloads by the virtual machine instance. The virtual machine instance can then terminate execution or otherwise be configured for a different purpose.

For specific entities, such as a customer or set of customers, the process of instantiating virtual machine instances may be repeated. As part of processing the lifecycle of the virtual machine instance, a service provider associated with providing the virtual machine instances can observe and record resource consumption. The service provider can then determine a virtual machine instance resource usage and operating metric profile based on processing resource consumption measurements and other operating metric information.

Additional aspects of the disclosure relate to generalizing the resource usage and operating metric profiles, generally referred to as operating profiles. For example, thousands or more of virtual machine instances may be instantiated and may utilize resources in a single network computing environment, such as a data center. Rather than determining and maintaining separate customized operating profiles for each virtual machine instance, virtual machine instances may be assigned to generalized or default operating profiles. Accordingly, groups of virtual machine instances may be categorized according to a variety of organizational criteria and assigned to the same operating profile. In some cases, the operating profiles may be hierarchical, such that a particular virtual machine instance configuration is associated with a particular operating profile, and also with a more general operating profile that is itself associated with multiple virtual machine instance configurations. There may be multiple levels to the hierarchy, with potentially thousands of virtual machine instance configurations associated with a single general operating profile or a small number of top-level operating profiles, and a larger number of more specific operating profiles at each level within the hierarchy. At the bottom level of the hierarchy may be a particular operating profile associated with a single virtual machine instance configuration as used by a particular customer.

Further aspects of the disclosure relate to identifying a target host computing device to provide computing resources to virtual machine instances based on an automatically determined operating profile. In some embodiments, particular physical host computing devices may be configured to provide target computing resources to multiple virtual machine instances concurrently. A predetermined amount of a computing resource may be reserved for use by a single virtual machine instance. When the operating profile for a virtual machine instance indicates that the virtual machine instance will not likely consume computing device resources that have been reserved for the instance, the host computing device may instantiate additional virtual machine instances. The additional virtual machine instances may be associated with, or have access to, host computing device resources concurrently with the previously instantiated virtual machine instances. Additionally, if any of the virtual machine instances consumes or otherwise restricts access to a resource such that the consumption meets or exceeds one or more thresholds specified in an operating profile for the virtual machine instance, one or more of the virtual machine instances may be transferred to another host computing device. For example, the virtual machine instance associated with consumption that exceeds a threshold may be transferred, or other virtual machine instances may be transferred.

Some computing resources are not necessarily provided by the host computing devices, but rather are off-host resources. For example, network topology may require communications from one host computing device to a second host computing device to traverse one or more links (e.g., network connections between switches and other network components). The number of links may be different for communications to a third host computing device. Data regarding link traffic and the number of links that communications will traverse between hosts may be recorded as a resource consumption measurement or operating metric. The data may be used in the future to determine on which host computing device to instantiate a virtual machine instance that may communicate with another host computing device. In addition, consumption of some computing resources does not necessarily reduce the amount of the resource that is available for other virtual machine instances or consumers generally. For example, a feature provided by a host computing device, such as a particular instruction set, may be generally referred to as a computing resource. Usage of the instruction set, however, does not necessarily reduce availability of the instruction set to another virtual machine instance, application, or other consumer.

Although aspects of the embodiments described in the disclosure will focus, for the purpose of illustration, on relationships and interactions between a management component, server computing devices, and virtual machines instantiated on the server computing devices on behalf of customers, one skilled in the art will appreciate that the techniques disclosed herein may be applied to any number of hardware or software processes or applications. For example, while virtual machine instances will be generally used as the illustrative computing resource consumer, other programs or workloads may be substituted, such as application software, operating systems, storage area network (SAN) nodes, and the like. In addition, while computing resources such as memory, CPU capacity, and network bandwidth will be used as the illustrative computing resources, other computing resources may be substituted, such as network link traffic, latency, processor instruction sets, and the like. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

FIG. 1 illustrates an example network computing environment 100 in which automated profiling of resource usage and assignment of resources based on those profiles may be implemented. Operating profiles and assignment of resources can be based on prior measurements of actual resource usage and other operating metrics, and also on expected future usage of resources. A network computing environment 100 can include a management component 102 and any number of physical host computing devices 104a-104n in communication via a network 110. One or more customers 122 may communicate with the components of the network computing environment 100 via a network 120.

Network computing environments 100 such as the one illustrated in FIG. 1 may be implemented in data centers and other environments in which multiple host computing devices 104a-104n provide computing services and resources to internal or external customers 122. As described in more detail below, each customer 122 may connect to the management component 102 or some other component within the network computing environment 100 to initiate computing processes. The initiation of computing processes may include instantiation of a virtual machine instance on a host computing device 104 or the configuration of an operating environment and one or more software applications. The virtual machine instance may execute on behalf of the user, consuming computing resources of the host computing device 104, network 110, and the like. While the present disclosure will focus, for purposes of illustration only, on the operation of a network computing environment 100 providing computing services to external or internal customers 122 through the use of virtual machines, the systems and processes described herein may apply to any implementation of a network computing environment 100, including one with no separate customer 122 entities or no virtual machine usage.

Each host computing device 104 may be a server computer, such as a blade server. Optionally, a host computing device 104 may be a midrange computing device, a mainframe computer, a desktop computer, or any other computing device configured to provide computing services and resources to multiple consumers, such as virtual machine instances, concurrently. In a typical implementation, a host computing device 104 can be configured to communicate with other host computing devices 104, a management component 102, or some other component of the network computing environment 100 via a network 110.

The network 110 may be a local area network (LAN), wide area network (WAN), some other network, or a combination thereof. In addition, the network computing environment 100 may connect to another network 120, such as a corporate or university network, or a collection of networks operated by independent entities, such as the Internet. Customers 122 of the network computing environment 100 may communicate with host computing devices 104 over the combination of the networks 120, 110. In some embodiments, the customers 122 may cause a computing device 102 to launch a virtual machine instance to execute various computing operations for or on behalf of the customer 122. Any number of virtual machine instances may be running on a single host computing device 104 at a given time. In addition, the various virtual machine instances running on a host computing device 104 may be associated with a single customer 122 or with a number of different customers 122.

The management component 102 may be implemented as hardware or as a combination of hardware and software. For example, the management component 102 may be a computing system of one or more computing devices configured to execute one or more software programs to perform the functions described herein. In some embodiments, the management component may include one or more of the host computing devices 104a-104n.

Figure 2:
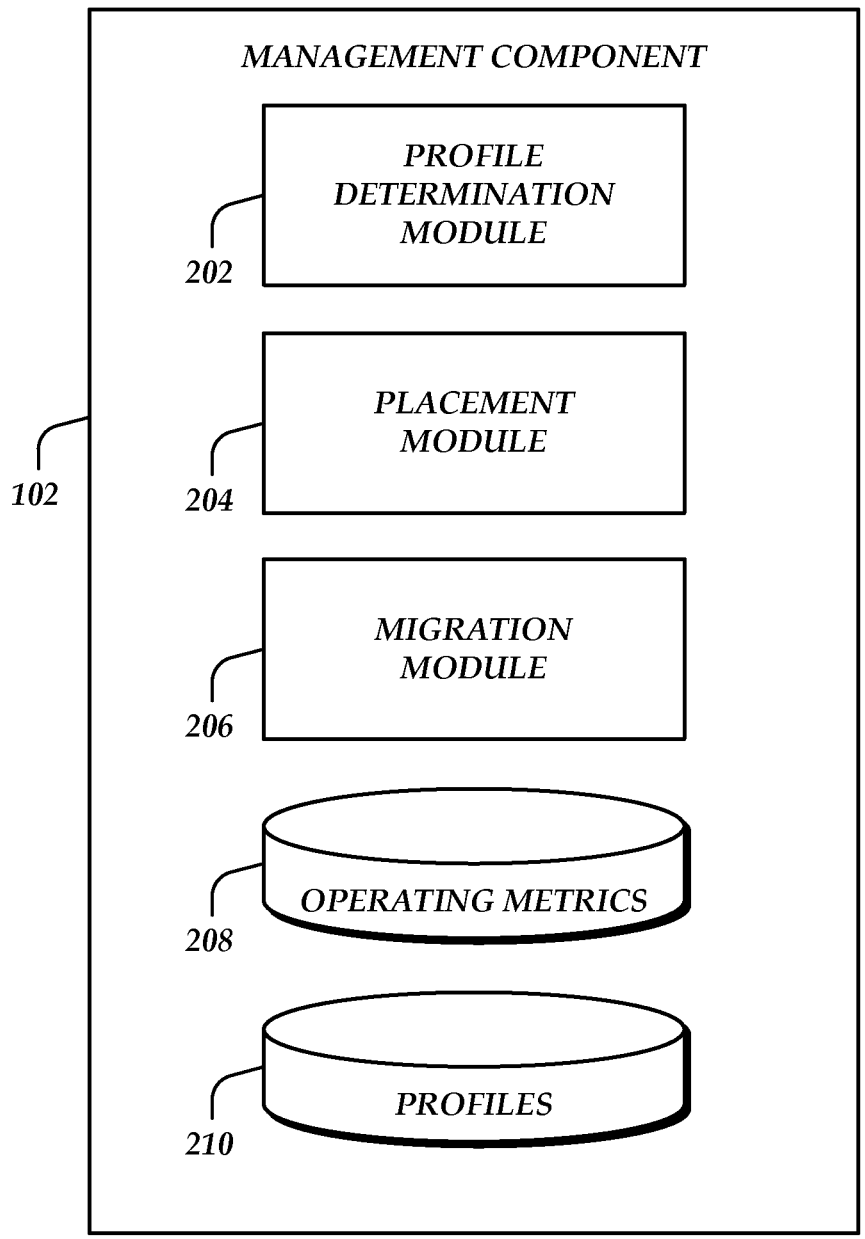
FIG. 2 is a block diagram of an illustrative management component including various modules and storage components.

FIG. 2 illustrates a sample management component 102 in greater detail. The management component 102 can include a profile determination module 202, a placement module 204, a migration module 206, an operating metrics data store 208, and a profile data store 210. In some embodiments, the management component 102 may include more or fewer modules and data stores than those illustrated in FIG. 2. For example, there may be no separate migration module 206, when the migration feature is not implemented, or implemented by the placement module 204. In another example embodiment, there may be additional data stores for generalized customer profiles.

In operation, the profile determination module 202 can obtain operating data regarding operating metrics and resource usage by instances of a particular virtual machine instance configuration at a particular time, of all virtual machine instances associated with a particular customer 122, etc. The profile determination module 202 can analyze the operating data and develop an operating profile of the computing resources utilized by the virtual machine instance or group of virtual machine instances being profiled. For example, operating data may include historical measurements regarding the amount of memory utilized, the central processing unit (CPU) utilization, the amount of network traffic transmitted or received, the amount of hard disk space utilized, the number of disk operations, the amount of electricity utilized (e.g.: the amount utilized by the host computing device 104 that may be attributable to the virtual machine instance), the amount of network link traffic initiated, and the like. The profile determination module 202 can then determine an average for each of the measurements associated with instances of a particular virtual machine instance configuration or group of virtual machine instance configurations, and store the averages in the operating profile. The operating profile need not be limited to average measurements. For example, the operating profile may include other statistical analyses, such as the median, standard deviation, usage histogram or any other appropriate or useful data. In some embodiments, the operating profile may further be characterized according to temporal characteristics of usage, such as the time of day, day of the year, etc.

The operating profile may also be characterized according to expected measurements and operating metrics. For example, a variance from an expected performance metric, generally referred to as jitter, may be observed and included in the operating profile. Such data may be used to determine whether design goals, service-level agreements and other promises or obligations to the consumer are being met or to determine how often they fail to be met. The placement module 204 may account for jitter when making future placement decisions, endeavoring to ensure that the same operating metric will not fall outside the expected range or otherwise ensuring that consumer obligations are satisfied. In some embodiments, the operating profile may contain other data, such as latency preferences or requirements, instructions set preferences or requirements, and the like. Such data may be provided by consumers or determined through analysis of virtual machine instance operation by the profile determination module 202.

Illustratively, a service provider may provide three classes of virtual machines: small, medium, and large. Each class may be associated with a predetermined amount of each computing resource that will be reserved for use by instances of the virtual machine (e.g.: small VMs may have 2 GB RAM, medium VMs may have 8 GB RAM, large VMs may have 32 GB RAM). Customers may instantiate instances of a virtual machine configured with an operating system and application software, such as a large virtual machine configured with web server software. Measurements may be recorded regarding usage of computing resources by an instance of the large virtual machine configured with web server software. The profile determination module 202 can then calculate expected resource usage amounts for future instances of the virtual machine instance configuration when, for example, used as a web server. The expected resource usage amounts may form the basis of the operating profile determined by the profile determination module 202. The profile determination module 202 may then modify the operating profile as a data set including measurements of actual resource usage is built over time.

The profile data that is used by the profile determination module 202 may be obtained from a variety of sources. As described above, the data may be obtained from an entity associated with the virtual machine. Data may also be obtained directly from a workload analysis component of the host computing device 104 on which the virtual machine instance is executing. In some embodiments, the data can be obtained from an operating metric data store 208. The operating metric data store 208 may be integrated with the management component 102, as illustrated in FIG. 2, or it may be physically located on a separate computing device, such as a dedicated relational database management system (RDBMS) server. The operating profiles that are determined by the profile determination module 202 may be stored in a profile data store 210. Similar to the operating metric data store 208, the profile data store 210 may be integrated with the management component 102 or located on separate computing device, such as a dedicated RDBMS server.

In some network computing environments 100, there may be thousands or more of virtual machine instances to profile, and each operating profile may, for example, be based on the analysis of usage data unique to particular virtual machine instance configurations or the usage of a particular customer. In order to efficiently utilize the operating profiles to make placement decisions regarding the instantiation of virtual machine instances on host computing devices 104a-104n, the operating profiles may be generalized. Accordingly, a number of different virtual machine instance configurations may be associated with the same, or substantially similar, operating profiles even though there may be variances in the actual resource usage associated with each virtual machine instance configuration. For example, the profile determination module 202 may associate a virtual machine instance configuration with predefined expected usage amounts rather than storing a customized operating profile for each virtual machine instance configuration. The predefined operating profile may include utilization ranges for each computing resource that is measured. In addition, the operating profiles may be hierarchical, such that a particular virtual machine instance configuration is associated with a particular operating profile, and also with a more general operating profile that is itself associated with multiple virtual machine instance configurations.

In some embodiments, the operating profiles may be further generalized into categories. For example, a number of virtual machine instance configurations, each associated with a different amount of network usage, may be categorized as "light network applications" or "heavy network applications" depending on whether the usage measurement exceeds or falls short of some threshold. In such a categorization scheme, a virtual machine instance configuration that, when instantiated, primarily performs local computing operations and rarely utilizes a network connection may be categorized in the same "light network applications" category as a virtual machine instance configuration that often utilizes a network connection, but only for very small transmissions which may be trivial in comparison to the amount of network bandwidth available to the host computing devices 104a-104n on which the virtual machine instance executes. Such generalized operating profiles may also be based on a composite of two or more categories, such as "light network application/heavy CPU application" and "light network application/light CPU application." Returning to the previous example, the two virtual machine instance configurations may be associated with different categories. The virtual machine instance configuration that, when instantiated, primarily performs local computing operations and rarely utilizes a network connection may be categorized as a "light network application/heavy CPU application," while the virtual machine instance configuration which, when instantiated, often initiates small network transmissions may be categorized as a "light network application/light CPU application" if the CPU utilization of the virtual machine instances fall below a threshold.

As described above, the operating profiles, whether specific to a virtual machine instance configuration or generalized to a number of virtual machine instance configurations, may be used to identify a host computing device 104a-104n on which to place virtual machine instances. The placement module 204 may be invoked when a customer 122 initiates a computing session or when a virtual machine is otherwise instantiated. The placement module 204 may determine which operating profile is associated with the virtual machine instance at the current time. For example, the operating profile may be a customized profile including measurements of actual resource usage associated with the virtual machine instance at the current time of day, during the current month of the year, etc. In some cases, the measurements may be specific to a particular customer, such that an operating profile for a particular customer may be created and accessed. The customer-specific operating profile can apply to a specific virtual machine instance configuration or it may generally apply to multiple distinct virtual machine instance configurations. Optionally, the operating profile may be a generalized profile based on the overall character of resource usage associated with the virtual machine instance, which may also be based on the current time of day, etc. The virtual machine placement module 204 can then select a host computing device 104 on which to launch the virtual machine instance based on the resource availability of the host computing devices 104a-104n and the expected resource usage of the virtual machine instance determined from the operating profile.

Resource utilization may be dynamic over the lifetime of a single instance of a specific virtual machine instance configuration, and over multiple instances of the specific virtual machine instance configuration. The migration module 206 of the management component 102 may monitor the resource utilization of each executing virtual machine instance and the host computing device 104 on which the virtual machine instance is executing. When the resource utilization changes, the migration module 206, similar to the virtual machine placement module 204 described above, may select an appropriate host computing device 104 on which to place the virtual machine instance. A new instance of the virtual machine may be launched on the selected host computing device 104, and the execution state of the virtual machine instance (memory, inputs, and the like) may be copied to the new virtual machine instance. When the new virtual machine instance is ready to begin executing, the previous virtual machine instance may be terminated without a loss of data and without a substantial loss of performance. The new virtual machine instance may execute more efficiently due to the available resources.

In some embodiments, rather than instantiating a new instance of the virtual machine on a different host computing device and terminating the previous instance, resources may be reallocated. When resource utilization or performance metrics change, additional resources (e.g., memory) may be allocated to the particular virtual machine. For example, a resource may be reallocated from other virtual machines that are not expected to fully utilize the resource.

Figure 3:
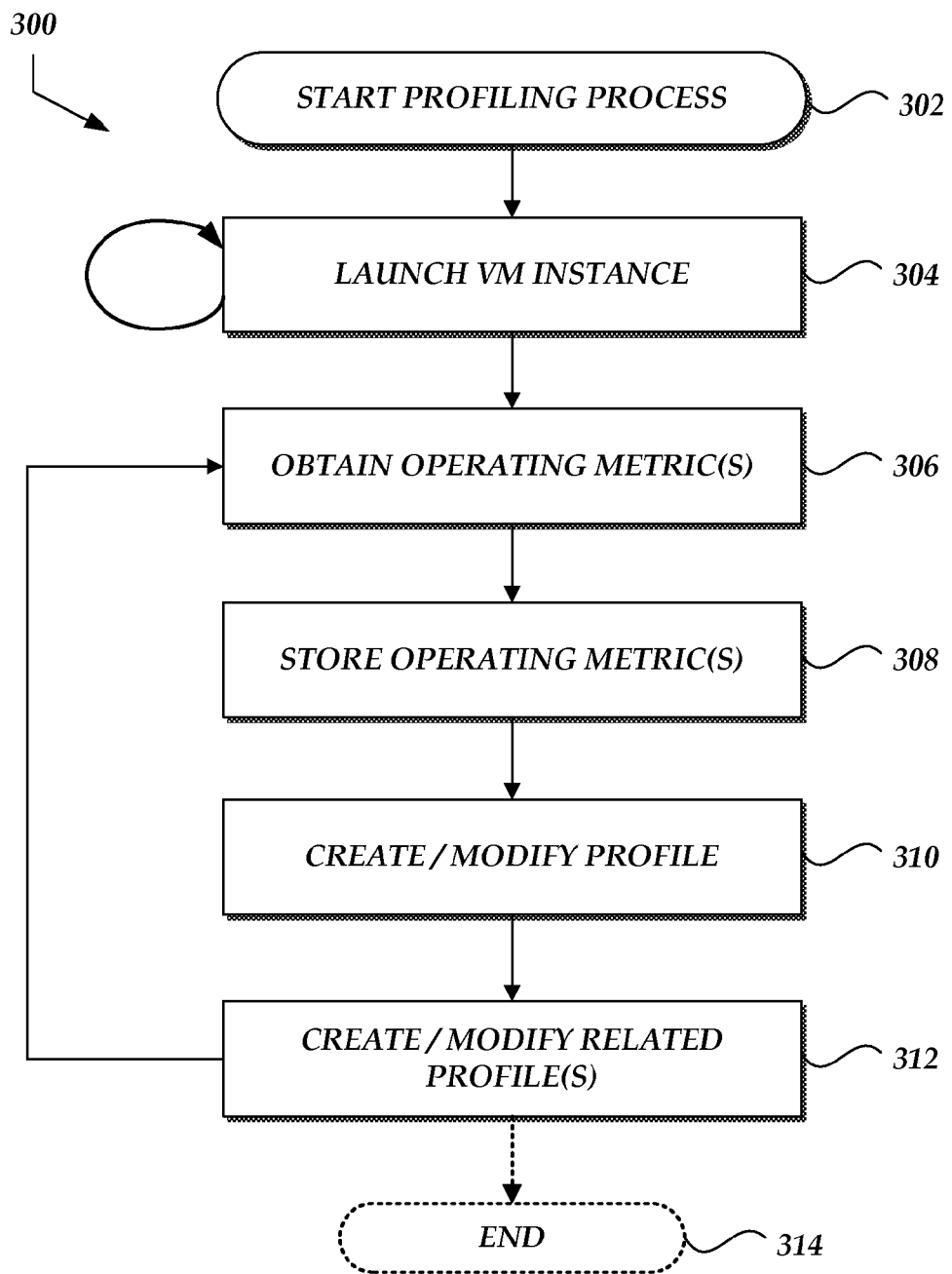
FIG. 3 is a flow diagram of an illustrative process for automatically profiling computing resource usage.

Turning now to FIG. 3, an illustrative process 300 for determining an operating profile for a virtual machine instance configuration will be described. The process 300 may be executed by a management component 102. The management component 102 may receive a request from a customer 122 or otherwise be notified to instantiate a virtual machine. After instantiating the virtual machine instance, identifying an instantiated virtual machine instance or causing the virtual machine to be instantiated, the management component 102 may monitor or otherwise receive operating data regarding computing resource utilization associated with the virtual machine instance. Based on the resource usage and operating metric data, the management component 102 can determine or update an operating profile for the virtual machine instance configuration, or update an existing operating profile. Advantageously, the operating profile may be compared with other operating profiles and generalized and the virtual machine instance configuration may be associated with a category of resource usage.

The process 300 begins at block 302. The process 300 may begin automatically, such as in response to the receipt of a request to instantiate a virtual machine. For example, the process 300 may be embodied in a set of executable program instructions and stored on a computer-readable medium drive of the computing system with which the management component 102 is associated. When the process 300 is initiated, the executable program instructions can be loaded into memory, such as RAM, and executed by one or more processors of the computing system. In some embodiments, the computing system may include multiple computing devices, such as servers, and the process 300 may be executed by multiple servers, serially or in parallel.

At block 304, the management component 102 or some other component launches a virtual machine instance. As described in detail below with respect to FIG. 5, the management component may select a host computing device 104 on which to launch the virtual machine instance based on the resources expected to be consumed by the virtual machine instance and the resources that the host computing devices 104a-104n currently have available. The resources expected to be consumed by the virtual machine instance or to be made available to the virtual machine instance may be determined from a preexisting operating profile, from information received from the customer 122 or other entity requesting that the virtual machine instance be launched, etc.

The process 300 may proceed to block 306 for the newly launched virtual machine instance in order to obtain operating metrics and to create or modify an operating profile. While the process 300 proceeds, any number of additional virtual machine instances may be launched and/or placed at block 304 based on the same operating profile, either as it originally existed, or as modified during the execution of the process 300 for previously launched virtual machine instances. In this way, the process 300 may be performed in any number of concurrent instances, generally corresponding to the number of virtual machine instances associated with the operating profile (or, in a hierarchy of profiles, a profile from a higher level in the hierarchy) that may be executing at a particular time.

At block 306, the resources utilized by the virtual machine instance may be monitored, and resource usage measurements and other operating metrics may be obtained. At block 308, the operating metrics may be recorded. The monitoring may be performed by the management component 102, or by some other component, such as a workload analysis component 421 of the host computing device 104 on which the virtual machine instance is executing. The operating metrics may be stored at the operating metrics data store 208. In embodiments using a workload analysis component 421, the workload analysis component 421 may store operating metrics temporarily or long-term. The workload analysis component may transmit data regarding the operating metrics to the management component 102 for storage in substantially real time, at scheduled intervals, upon virtual machine termination, at some other time, or not at all.

Figure 4:
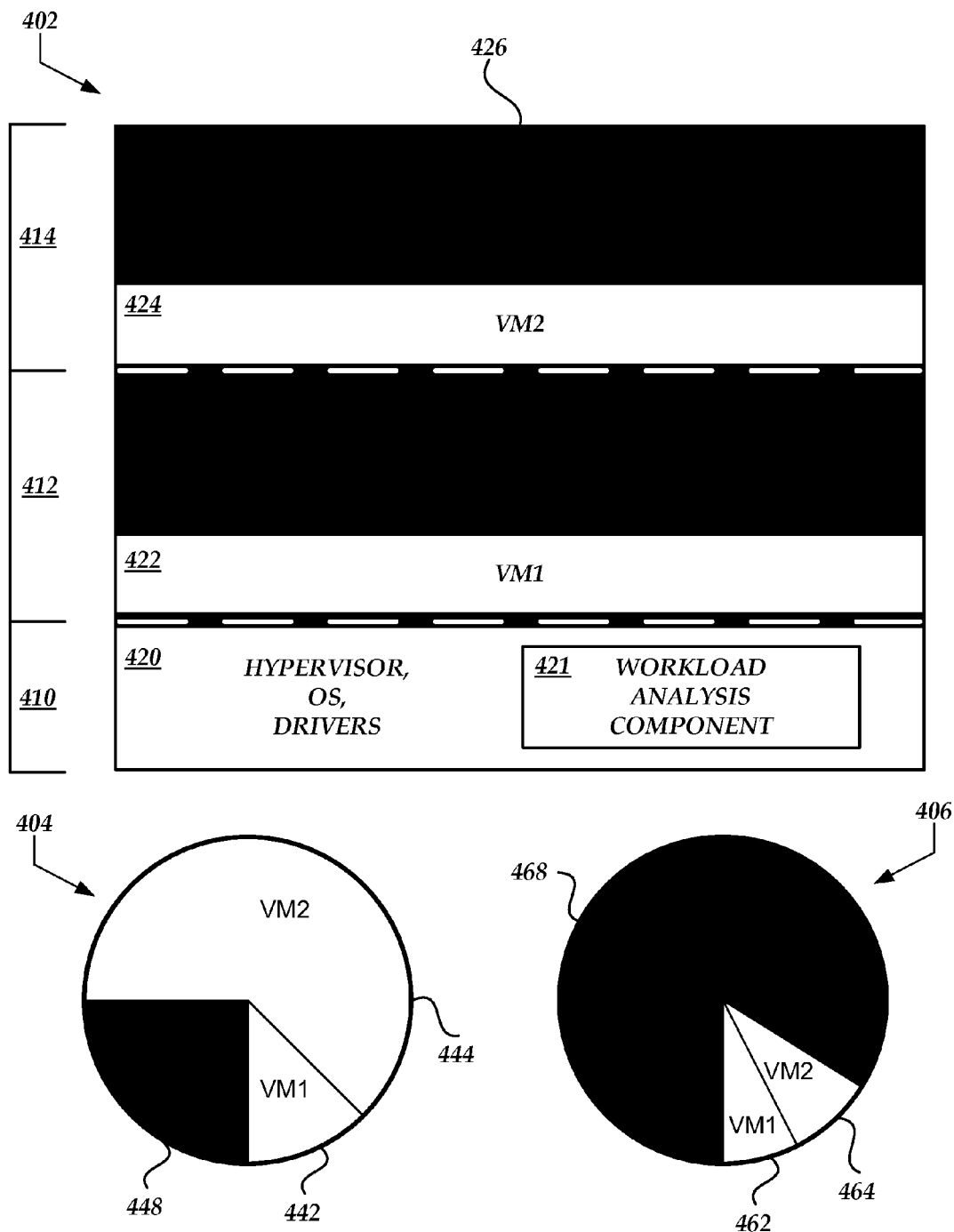
FIG. 4 is a block diagram of an illustrative host computing device hosting virtual machines which utilize computing resources provided by the computing device.

FIG. 4 illustrates measurement of the utilization of several resources provided to multiple virtual machine instances by a host computing device 104. As illustrated in FIG. 4, a host computing device 104 may provide computing resources, such as memory 402, a CPU 404, and a network bandwidth 406. In some embodiments, additional or fewer computing resources may be provided to virtual machine instances. For example, a virtual machine instance may not be permitted to communicate with other devices, and therefore utilization of the network interface 406 need not be measured. In another example, a host computing device 104 may provide and track utilization of hard disk space, hard disk operations, electrical power, and the like.

In some embodiments, a provider of computing resources, such as an operator of a network computing environment 100, may provide customers with a set amount of computing resources on which to execute a virtual machine instance. For example, a customer 122 may reserve for one of its virtual machine instance configurations a predetermined amount of memory, such as random access memory (RAM), a predetermined amount of computing capacity, such as CPU cores, and a predetermined amount of network bandwidth, as provided by a network interface. Memory 402 of a host computing device 104 may be segregated into portions 410, 412, 414 which are reserved for single virtual machine instances (e.g.: portions 412, 414) or for the operation of the host computing device 104 and other internal procedures (e.g.: portion 410). The portion reserved for operation of the host computing device 104 may include a hypervisor for assisting in the launch, execution, and termination of virtual machine instances, an operating system, drivers, and the like. In addition, the host computing device 104 may include a workload analysis component 421 which monitors resource utilization and optionally communicates with the management component 102. The workload analysis component 421 may also reside in the memory space 410, and may be integrated into the hypervisor 420 or may be an independent component which shares the memory space 410. In some embodiments, the workload analysis component 421 may reside in a memory space 412, 414 reserved for customer virtual machine instances. In such cases, the workload analysis component 421 may be integrated into the virtual machine instance configurations or included in the virtual machine instance upon instantiation. In further embodiments, the workload analysis component 421 may reside in a separate memory space reserved for it, or may be implemented as a component, such an independent hardware device, which does not share the memory 402 of the host computing device 104.

In many cases, a virtual machine instance may not utilize the entire portion of a resource that is reserved for it. For example, VM1 422, illustrated in FIG. 4, may be a virtual machine instance of a customer 122, and may be launched into memory space 412, the entirety of which is reserved for use by VM1 422. In operation, VM1 422 may not utilize the entire memory space 412, and in some cases may utilize on a small fraction of the reserved memory space 412. At times, however, the utilization of the memory space 412 may change, and VM1 422 may utilize substantially all of the memory space 412. The workload analysis component 421 may monitor these changes and record measurements and other data, such as the time of day, the specific virtual machine instance configuration, or which other virtual machine instances, if any, were executing on the host computing device 104. The workload analysis component 421 may transmit the data to the management component 102 or to a data store. In some embodiments, the workload analysis component 421 may temporarily store the data and later transfer it to the management component 102, such as on a schedule, or in response to a triggering event, such as the termination of VM1 422. Similar to measuring and recording data about the utilization of memory 402, the workload analysis component 421 or some other component may monitor usage of the CPU 404, network interface 406, or any other computing resource utilized by VM1 422.

Data may be obtained and recorded regarding any variances from expected or preferred operating metrics. For example, resource usage measurements and other operating metrics may be recorded and compared to the operating profile in order to determine whether there is a variance from an expected or preferred metric. In some cases, the operating metrics may be recorded on a customer-by-customer basis. Data regarding a variance may be recorded so that future placement or migration decisions may be made based on the variance. In addition, data regarding off-host resources, such as latency, link traffic, and the like may be recorded. The workload analysis component 421 may record such data, or some component external to the host (e.g., the management component 102 or a switch) may observe the operating metrics. In some embodiments, resource usage that does not necessarily reduce the availability of the resource may be determined. For example, if a virtual machine instance or application software running thereon performs certain cryptographic operations or is observed calling certain cryptographic functions or instructions, such data may be recorded. The placement module 204 or migration module 206 may consider such data when launching or migrating an instance of the virtual machine. A host computing device may be selected which provides more efficient or more powerful cryptographic instructions, such a device supporting Intel® Advanced Encryption Standard (AES) New Instructions (AES-NI) or similar device.

At block 310, the profile determination module 202 or some other module of the management component 102 may modify an operating profile associated with the virtual machine instance, or create a new operating profile. As described above, operating profiles may include information about typical or expected resource usage, variances from expected or desired operating metrics, and the like. For example, the operating profile may consist of average measurements for each of a number of different instances of a single virtual machine instance configuration. Each resource may be associated with multiple measurements which correspond to operating based on a particular customer, a time of day, a day of the year, or other environmental factors.

In some embodiments, each resource of the operating profile may be associated with a score or some other indication of utilization rather than a statistical measurement. For example, each resource may be assigned a score of 1-10, where higher numbers are associated with the heaviest and/or most frequent users of a resource. In some embodiments, the operating profiles may be generalized further. A predefined set of generalized operating profiles may cover ranges of measurements or scores for each resource. For example, the virtual machine instance configuration from which VM1 422 was instantiated may be assigned to one generalized operating profile if, during nighttime hours, VM1 422 utilizes no more than 25% of its memory space 412 but utilizes almost 100% of its CPU availability. The generalized operating profiles may include multiple ranges of measurements for each resource, depending on the time of day or other factors. Returning the previous example, the virtual machine instance configuration from which VM1 422 is instantiated may be instead assigned to a different predefined operating profile if the virtual machine instances typically utilize resources in that manner described above during nighttime hours, but during daytime hours it utilizes 50% of both its memory segment 412 and CPU availability. Multiple generalized operating profiles may be assigned to particular virtual machine instance configurations based on usage by particular customers. For example, each customer that users the virtual machine instance configuration may be associated with a different operating profile.

In some embodiments, each customer 122 may be associated with a generalized operating profile even though it has a number of different virtual machine instance configurations, and even though each virtual machine instance configuration may utilize resources differently. A customer 122 may have one virtual machine instance configuration, such as the one from which VM1 422 in FIG. 4 is instantiated, which may be independently profiled as a light CPU application, while another virtual machine instance configuration, such as the one from which VM2 424 is instantiated, may be independently profiled as a heavy CPU application. The customer 122 may be profiled as a moderate CPU user, because its average CPU use is moderate. Optionally, the customer 122 may be profiled as a heavy CPU user, because it has at least one virtual machine instance configuration which is a heavy CPU application. In other embodiments, customers may have several associated operating profiles for each virtual machine image configuration. Different customers or users of substantially the same virtual machine image, such as VM1 422, may use different amounts of resources, even though the virtual machine image is a common configuration. A given customer starting a particular VM may be more likely to use that VM in the same way as previously recorded, and consume approximately the same resources.

Operating profiles for each virtual machine instance configuration may be stored in the profiles data store 210. The actual measurements for each profile may be stored in the operating profile, or an ID or other indication of which category or generalized operating profile the virtual machine instance configuration is associated with may be stored. In embodiments which determine and utilize customer profiles instead of or in addition to virtual machine profiles, customer profile data may be stored in the same data store 210 or in a different data store.

At block 312, related or generalized operating profiles may be created or modified. For example, higher-level profiles may be created or modified if hierarchical profiles are used. Historical operating metrics may be accessed from the operating metrics data store 208 for each virtual machine instance configuration associated with the high-level operating profile, in some cases regardless of which lower-level profiles the virtual machine instance configurations are associated with. Statistical analyses may be performed and operating metric variances may be determined as described above. Advantageously, the modified high-level or generalized operating profile may be accessed and used by the placement module 204 or migration module 206 when instantiating or migrating virtual machine instances that are different from the virtual machine instance associated with the current execution of the process 300. Accordingly, the recorded operating metrics associated with one virtual machine instance may be used to fine tune the placement and execution of other virtual machine instances, even those which are not instantiated from the same virtual machine instance configuration.

Figure 5:
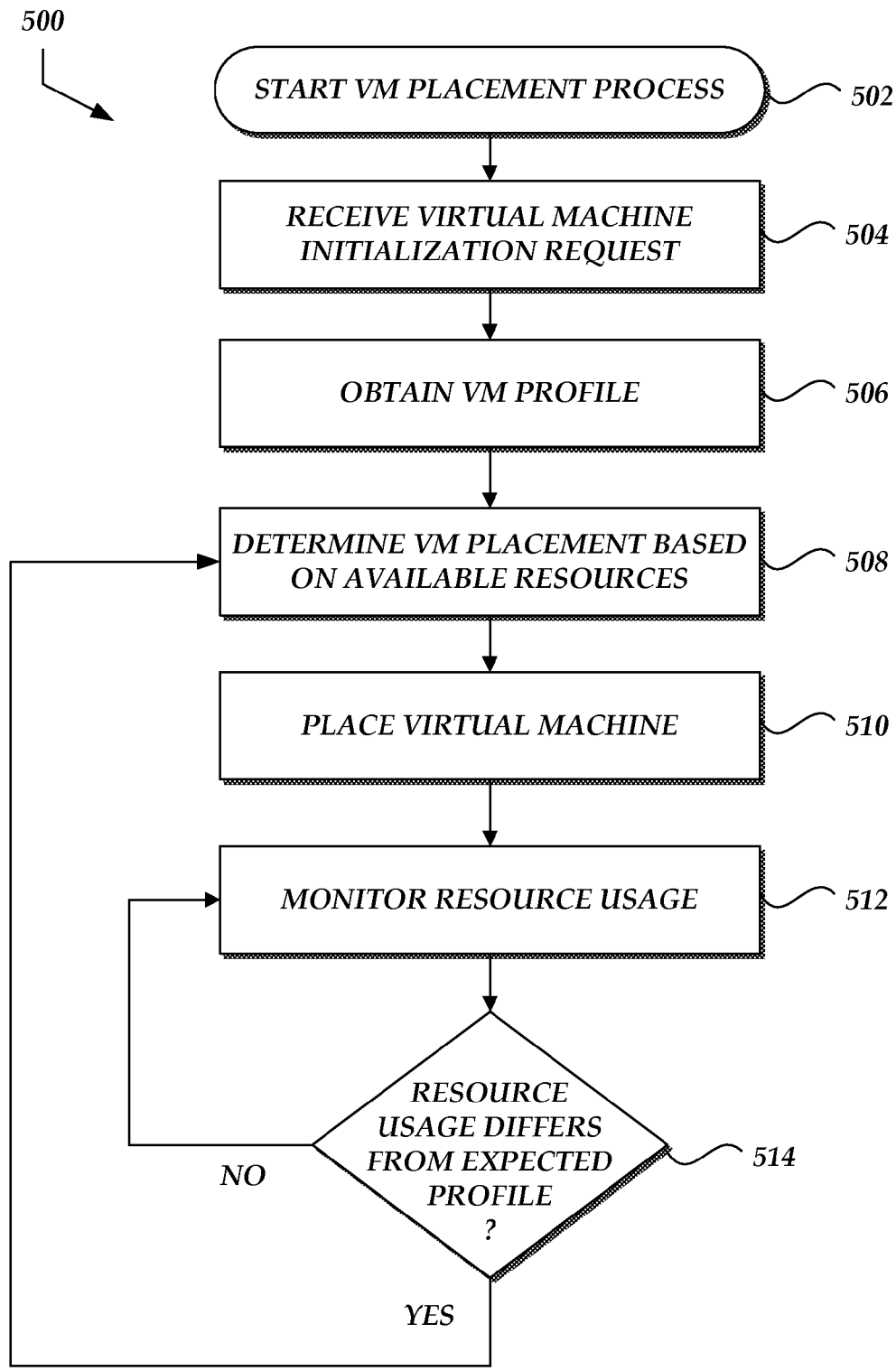
FIG. 5 is a flow diagram of an illustrative process for launching virtual machines on host computing devices, allocating and oversubscribing computing resources, and migrating currently executing virtual machines in order to further optimize computing resource utilization.

Turning now to FIG. 5, an illustrative process 500 for determining placement of virtual machine instances based on operating profiles will be described. The process 500 may be executed by a management component 102. The management component 102 may receive a request from a customer 122 or may otherwise be notified to launch an instance of a virtual machine from a specific virtual machine instance configuration or image. The management component 102 can identify host computing devices 104a-104n which are able to host the virtual machine instance and determine the current status of the host computing devices 104a-104n with respect to available computing resources. Advantageously, the management component 102 may also obtain an operating profile for the virtual machine instance configuration to be instantiated, and determine which of the available host computing devices 104a-104n may most efficiently host the virtual machine from the standpoint of available resources. A host computing device 104 may be selected which is already executing virtual machines and which has committed most or all of its resources to host virtual machines already executing. Based on operating profiles of the currently executing virtual machine instances and of the virtual machine instance to be launched, the management component 102 may launch the virtual machine instance on the host computing device 104 if the management component 102 determines that the host computing device 104 can provide the computing resources that the virtual machine instances will likely consume. In some cases, this may include oversubscribing resources (e.g., allocating the same resources to multiple virtual machine instances). Moreover, the management component 102 can monitor the execution of the virtual machine instances on the host computing device 104, and transfer execution of one or more virtual machine instances to another host computing device 104 if there are not enough computing resources to satisfy each virtual machine instance.

The process 500 begins at block 502. The process 500 may be initiated automatically, such as in response to the receipt of a request to launch a virtual machine instance. For example, the process 500 may be embodied in a set of executable program instructions and stored on a non-transitory computer-readable medium drive of the computing system with which the management component 102 is associated. When the process 500 is initiated, the executable program instructions can be loaded into memory, such as RAM, and executed by one or more processors of the computing system. In some embodiments, the computing system may include multiple computing devices, such as servers, and the process 500 may be executed by multiple servers, serially or in parallel.

At block 504, the management component 102 may receive a request or some other notification to initialize a virtual machine instance. The notification may be received from a customer 122, a host computing device 104, or some other component or entity. In some embodiments, a virtual machine instance may request initialization of another virtual machine instance, another instance of the same virtual machine instance configuration or image, etc.

At block 506, the VM placement module 204 or some other module of the management component 102 may obtain an operating profile for the virtual machine instance to be launched. The operating profile may be loaded from the profile data store 210 or obtained from some other source. The VM placement module 204 may inspect the operating profile to determine which resources the virtual machine instance is likely to utilize and in which quantity. As described above, the operating profile of the virtual machine instance configuration may be different depending on environmental factors, such as the time of day. In such cases, the VM placement module 204 of the management component 102 can consider such environmental factors when inspecting the operating profile.

At block 508, the VM placement module 204 or some other module of the management component 102 may select a host computing device 104 on which to launch the virtual machine instance based on available resources and the operating profile. For example, a network computing environment 100 may include a number of host computing devices 104a-104n. The host computing devices 104a-104n need not be identical; some may have more or less RAM than others, more or less powerful processors or a different number of processors, etc. The VM placement module 204 may select a host computing device 104 on which to launch the virtual machine instance based on the expected resource utilization as identified by the operating profile and by the resources that each computing device makes available.

In some embodiments, a host computing device 104 may be configured to host a set number of instances of a particular virtual machine or class of virtual machines. As shown in FIG. 4, the host computing device 104 may have an amount of memory 402 such that it can reserve a predetermined memory space 410 for the hypervisor 420, and two additional memory spaces 412, 414 of a predetermined size for virtual machines. Two virtual machine instances 422, 424 may be launched on the host computing device 104, with each virtual machine instance 422, 424 assigned a separate memory space 412, 414. A customer 122 may reserve a particular amount of a resource to be available to its virtual machine instances 422, 424, such as by selecting a particular class of virtual machine (e.g.: small, medium or large as described above) to configure. The memory spaces 412, 414 may correspond to the maximum allowable amount of resources available to the virtual machine instances 422, 424, as reserved by the customer 122. However, in practice the virtual machine instances 422, 424 may not utilize the entire amount of a computing resource that is reserved for them. For example, as seen in FIG. 4, the virtual machine instances 422, 424 are only utilizing a fraction of the memory spaces 412, 414 that are reserved for them. It may be advantageous to utilize such excess memory space and other excess computing resources so as to reduce the number of host computing devices 104a-104n required to service all currently executing virtual machine instances or to more efficiently utilize the resources of those host computing devices 104a-104n which are operating.

Figure 6:
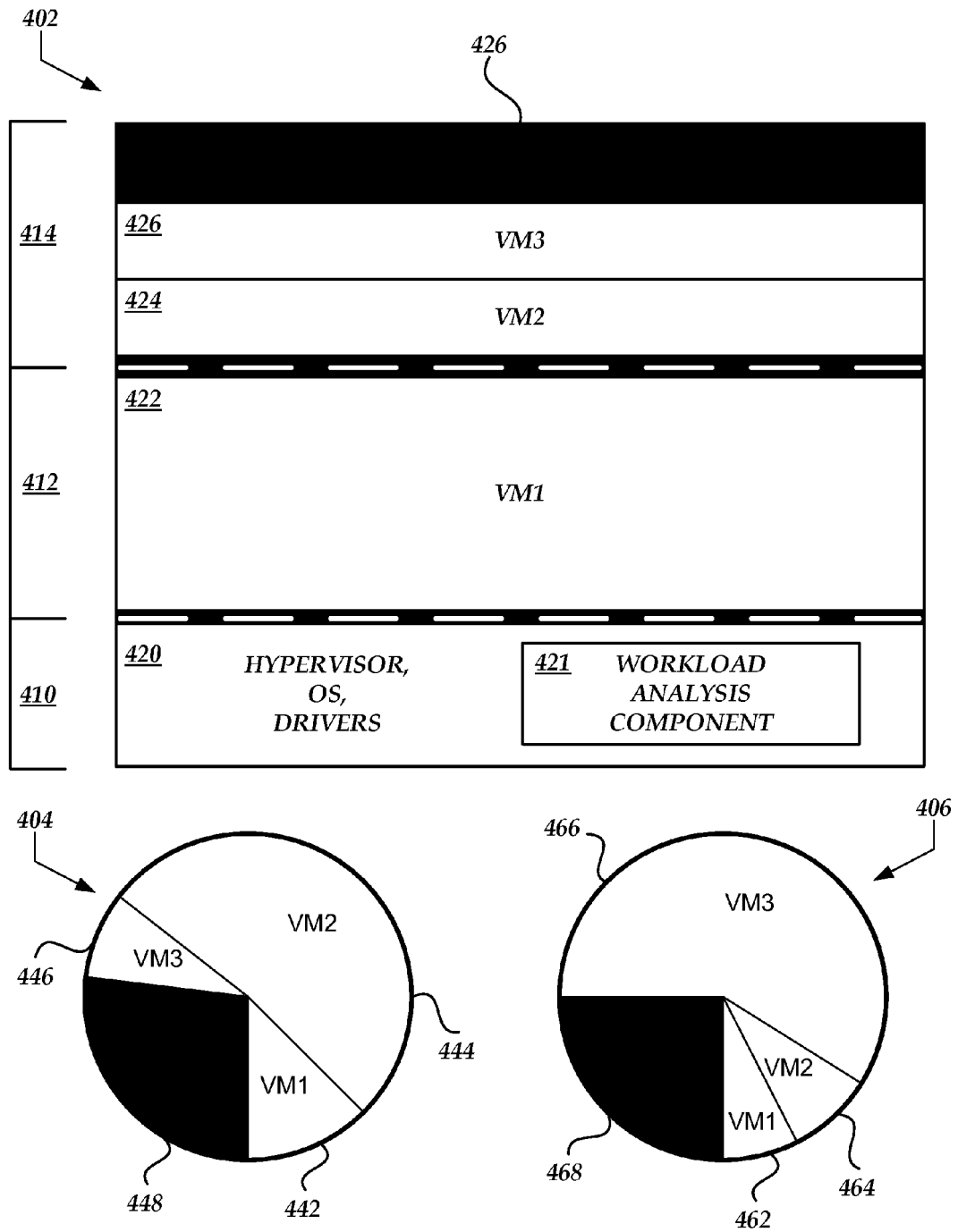
FIG. 6 is a block diagram of an illustrative host computing device in which various computing resources are oversubscribed and excess capacity remains available.

FIG. 6 illustrates a host computing device 104 with oversubscribed computing resources. A third virtual machine instance 426 has been launched on the host computing device 104 even though the host computing device 104 only contains two memory spaces 412, 414 available for virtual machine instances. Based on the operating profile associated with each of the virtual machine instances 422, 424, 426, the VM placement module 204 may determine that VM2 422 utilizes only a fraction of its available memory space 414, and VM3 426 also uses only a fraction of its available memory space when it is launched. Therefore, the VM placement module 204 may launch VM3 426 on the same computing device as VM2 424 and assign them to the same memory space 414.

As seen in FIG. 6, VM1 422 utilizes substantially all of its memory space 412, and therefore the VM placement module 204 may not assign another virtual machine instance to the same memory space 412 due to the operating profile of VM1 422. However, VM1 422 utilizes only a small amount of CPU capacity 442, and therefore a host computing device 104 on which VM1 422 is executing may be a candidate for oversubscription if the operating profiles of the virtual machine instances are complementary. In the example illustrated in FIG. 6, VM2 424 utilizes a large amount of CPU capacity 444. However, if the operating profile of VM3 426 indicates that it is a light user of CPU capacity, then the three virtual machine instances VM1 422, VM2 424, and VM3 426 may be candidates for oversubscription due to the complementary, rather than overlapping, operating profiles of the virtual machine instance configurations from which they are instantiated. Additional resources may be factored into an oversubscription determination in order to ensure that each virtual machine instance executing on a host computing device 104 has readily available to it the amount of each computing resource that it typically requires. For example, network bandwidth utilization 406, as illustrated in FIG. 6, also supports the oversubscription determination example described above because, even though the operating profile for VM3 426 may indicate that it is a heavy network bandwidth application, VM1 422 and VM2 424 utilize only a small amount of network bandwidth.

At block 510, the VM placement module 204 or some other module of the management component 102 may place the virtual machine instance on the host computing device 104 that is identified in block 508. As described above, the virtual machine instance may be placed on a host computing device 104 with other virtual machine instances which have reserved amounts of computing resources totaling or exceeding the amount provided by the host computing device 104. In some cases, the oversubscription may be substantial.

Figure 7:
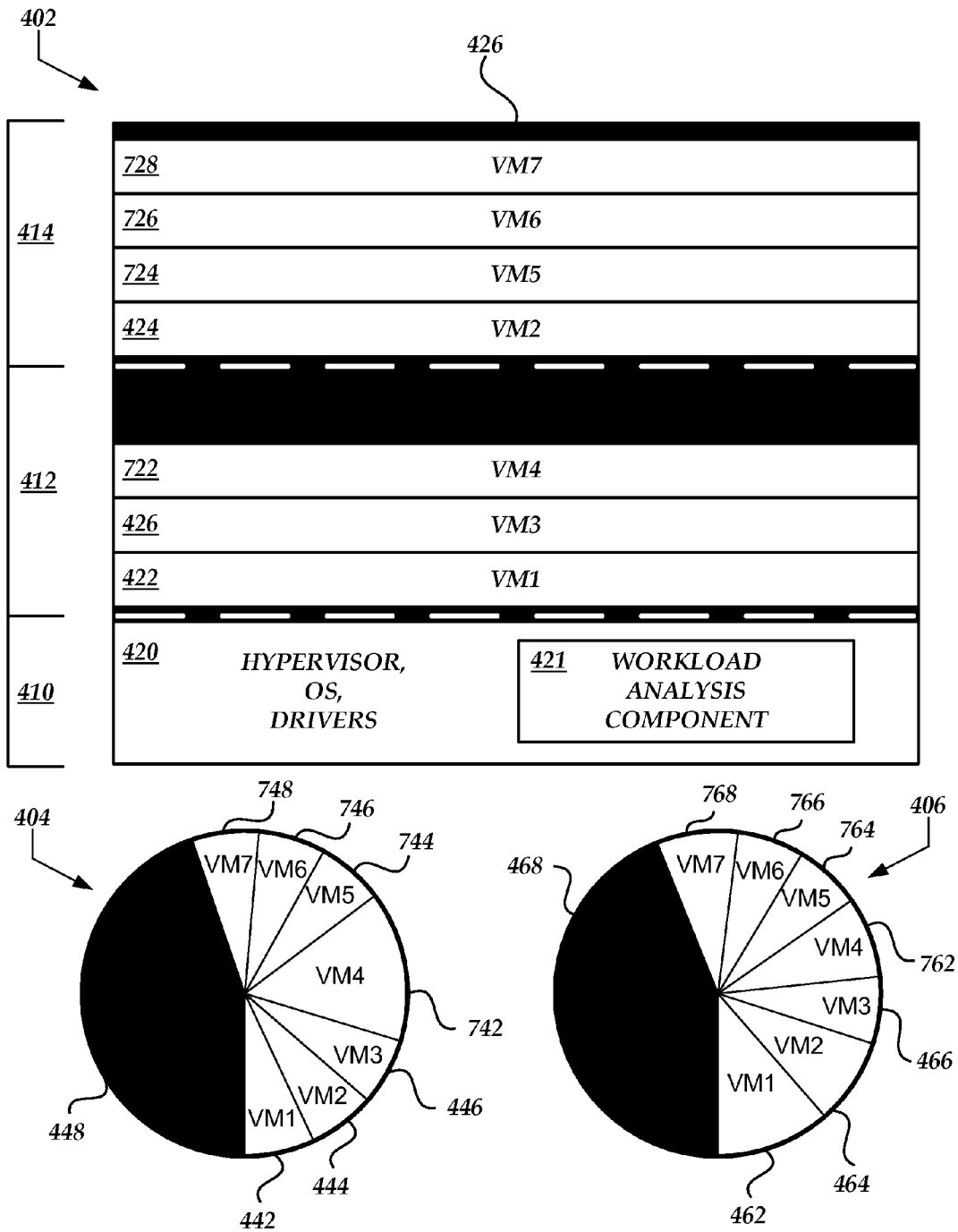
FIG. 7 is a block diagram of an illustrative host computing device in which various computing resources are substantially oversubscribed due to minimal resource utilization of each virtual machine executing on the host computing device.

FIG. 7 illustrates a substantially oversubscribed host computing device 104. As described above, customers 122 may reserve a specified amount of computing resources for use by virtual machine instances of the customer. However, in some cases a customer 122 may have substantially overestimated the amount of computing resources that its virtual machine instances may actually use. In extreme cases, customer 122 may reserve a large quantity of computing resources, launch virtual machine instances associated with those resources, and then let the virtual machine instances sit idle or otherwise substantially underuse the reserved resources. Over the course of time, operating profiles may be developed for the virtual machine instances or for the customer 122 which reflect the substantial underuse of reserved resources. The management component 102 may then launch a large number of such low-utilization virtual machine instances on a single host computing device 104. The host computing device 104 of FIG. 7 includes seven different virtual machine instances 422, 424, 426, 722, 724, 726, 728 sharing computing resources which may typically be reserved for only two virtual machine instances, as described above with respect to FIGS. 4 and 6. However, there is still excess capacity of each of the three computing resources 402, 404, 406. In some cases, hundreds or more of virtual machine instances may be placed on a host computing device 104, such as when the host computing device 104 has a large amount of available computing resources and the virtual machine instances are substantially idle.

At block 512, the resource utilization of each virtual machine instance may be monitored. Over the lifetime of the specific virtual machine instances, the workload analysis component 421 may monitor operating and notify the management component 102 if one of the virtual machine instances begins to utilize resources at a level that is not serviceable by an oversubscribed host computing device 104, or if the resource usage or an operating metric otherwise differs from an expected or desired amount. In some embodiments, the management component 102 may perform the monitoring.

At block 514, the management component 102 can determine whether resource usage or an operating metric differs from an expected or desired amount. For example, the management component can determine whether a change in resource usage exceeds a threshold or may otherwise cause undesirable performance degradation. A virtual machine instance which begins to utilize more of a computing resource than expected, based on its operating profile and the placement determined by the management component 102, may be transferred to a host computing device 104 that is oversubscribed to a lesser extent, or to a host computing device 104 that is not oversubscribed at all. In such cases, execution of the process 500 can return to block 508, where the VM migration module 206 or some other management component 102 determines to which computing device to transfer the virtual machine 842.

Figure 8:
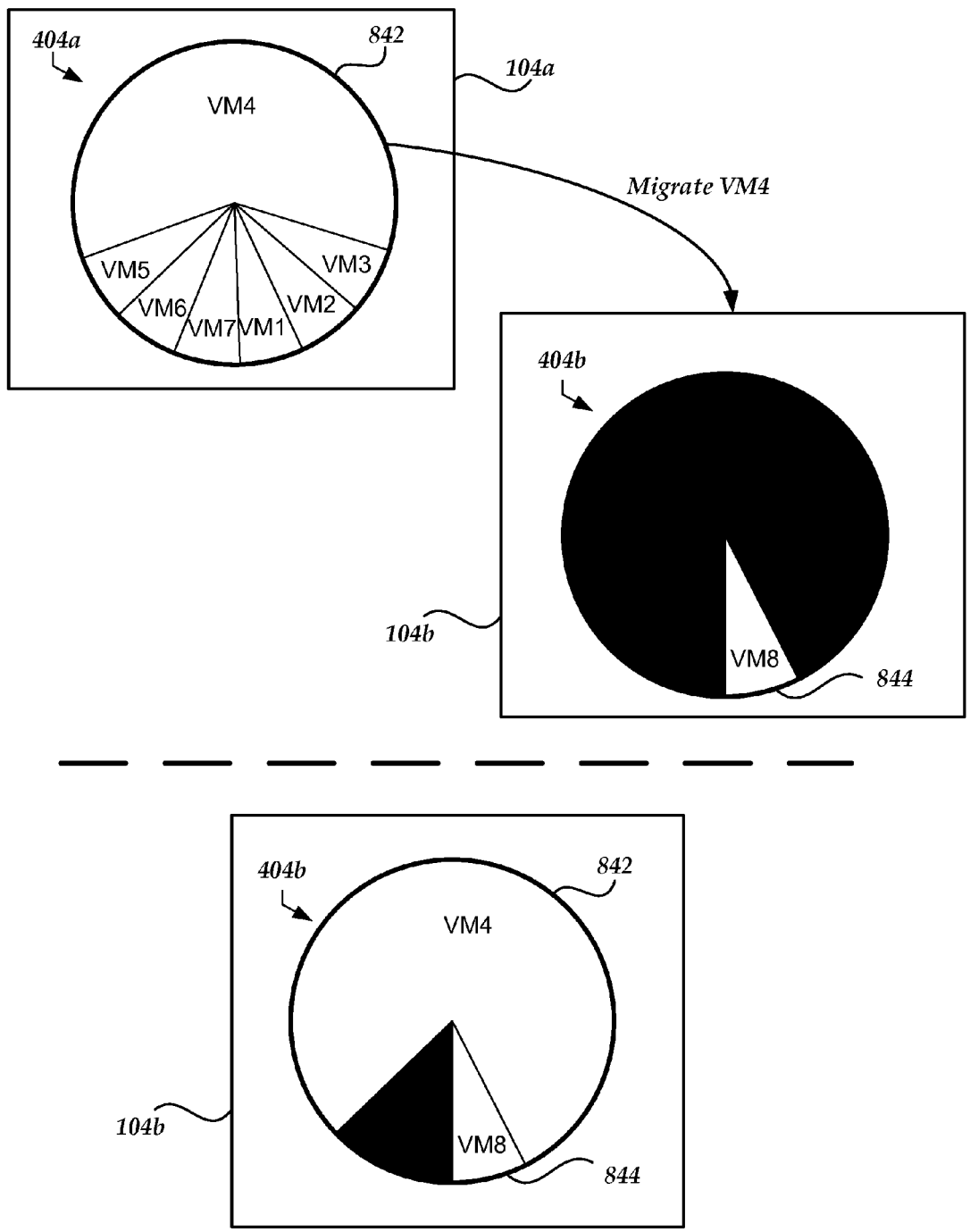
FIG. 8 is a block diagram of an illustrative migration of a virtual machine from one host computing device to another host computing device due to oversubscription and a lack of available computing resource capacity.

FIG. 8 illustrates a host computing device 104a which has oversubscribed CPU capacity 404a. A virtual machine instance VM4 842 may begin to consume a large amount of available CPU capacity 404a, in contradiction to its operating profile. However, the customer 122 associated with the virtual machine instance VM4 842 may have reserved a large amount of CPU capacity for the virtual machine instance configuration from which VM4 842 is instantiated, and therefore it may be desirable to provide the virtual machine instance VM4 842 with more CPU capacity than an oversubscribed host computing device 104a can provide. As shown in FIG. 8, the host computing device 104b may be a candidate for such a transfer. The virtual machine instance VM8 844 is currently consuming only a small fraction of the CPU capacity 404b available on the host computing device 104b, and the management component 102 may determine that the operating profile associated with VM8 844 indicates that it is not likely to consume more. The VM migration module 206 can initiate transfer of VM4 842 from host computing device 104a to host computing device 104b.

Transfer of a virtual machine instance may include first launching an instance of the same virtual machine instance configuration or image on the target host computing device 104b while the virtual machine instance on the source host computing device 104a continues to execute. The execution state of the virtual machine instance on the source host computing device 104b, including the data in the memory space or hard disk associated with the virtual machine instance, network connections established by the virtual machine instance, and the like, can then be duplicated at the target host computing device 104b. The virtual machine instance on the source host computing device 104a can be terminated, and the virtual machine instance on the target host computing device 104b can continue execution from that point.

In some embodiments, the initial placement or transfer of a software workload (e.g., an application or storage node) may be associated with virtual machine instance use of, or interaction with, the software workload, even though the software workload may not necessarily be a virtual machine instance itself. For example, a software workload may consist of a storage node implemented as an agent storing data according to the expectations of virtual machine instances that may be using the data. In such cases, initial placement or transfer of the workload (in this case, the storage node) may be based on placing it near or otherwise making it more accessible by the virtual machine instance or instances that will be using it.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for profiling computing resource usage, the system comprising:
    one or more processors;
    a computer-readable memory; and
    a management module comprising executable instructions stored in the computer-readable memory, the management module, when executed by the one or more processors, configured to:
        obtain at least one measurement of usage of a first computing resource over at least a portion of a lifecycle of a virtual machine instance, wherein the at least one measurement of total usage is associated with at least a first instance of a virtual machine instance configuration, and wherein the usage of the first computing resource varies over at least the portion of the lifecycle of the virtual machine instance;
        calculate, based at least in part on the at least one measurement of total usage, an expected amount of usage of the first computing resource over a lifecycle of a virtual machine instance, wherein the expected amount of usage is associated with the virtual machine instance configuration, and wherein the expected amount of usage varies over the lifecycle of the virtual machine instance; and
        receive a request for initialization of a second instance of the virtual machine instance configuration; and
        in response to the request;
            identify a computing device of a plurality of computing devices based at least on whether an available amount of the first computing resource on the computing device is greater than the expected amount over the lifecycle of the virtual machine instance; and
            cause, at least in part, the second instance to be initialized on the computing device.

2. The system of claim 1, wherein usage of the first computing resource comprises one of central processing unit (CPU) utilization, memory utilization, network utilization, hard disk utilization, or electrical power utilization.

3. The system of claim 1, wherein the management module, when executed, is further configured to:
    obtain the plurality of prior measurements regarding usage of the first computing resource; and
    determine an operating profile for the virtual machine instance configuration based at least in part on the plurality of prior measurements, wherein the operating profile comprises the expected resource usage amount.

4. The system of claim 3, wherein the operating profile further comprises a desired operating characteristic of the computing device.

5. The system of claim 4, wherein the desired operating characteristic relates to memory capacity, central processing unit (CPU) capacity, network bandwidth, network latency, position within a network topology, instruction set, or variance of a performance metric.

6. The system of claim 4, wherein identifying the computing device comprises determining that a characteristic associated with the computing device corresponds to the desired characteristic.

7. A system for profiling computing resource usage, the system comprising:
    one or more processors;
    a computer-readable memory including executable instructions that, when executed by the one or more processors, configure the system to:
        calculate an expected operating constraint for an instance of a virtual machine based at least in part on operating metrics determined from running at least a prior instance of a similar virtual machine, wherein the expected operating constraint varies over a lifecycle of the instance of the virtual machine;
        receive a request to instantiate the virtual machine; and
        in response to the request:
            identify a host computing device, of a plurality of host computing devices, associated with one or more operating characteristics related to the operation of virtual machine instances based partly on whether the one or more characteristics satisfy the expected operating constraint over at least a portion of the lifecycle of the instance of the virtual machine; and
            cause at least in part, a new instance of the virtual machine to be instantiated on the host computing device.

8. The system of claim 7, wherein at least one of the operating metrics relates to central processing unit (CPU) utilization, memory utilization, network utilization, hard disk utilization, or electrical power utilization.

9. The system of claim 7, wherein at least one of the one or more characteristics comprises memory capacity, central processing unit (CPU) capacity, network bandwidth, network latency, position within a network topology, instruction set, or variance of a performance metric.

10. The system of claim 7, wherein the operating constraint relates to an expected usage amount of a computing resource provided by the host computing device.

11. The system of claim 10, wherein the expected usage amount is further based at least in part on data received from a customer associated with the virtual machine.

12. The system of claim 7, wherein the module, when executed, is further configured to:
receive an additional operating metric regarding operation of the new instance on the host computing device, the additional operating metric related to the one or more operating characteristics; and
in response to determining, based on the additional operating metric, that the one or more operating characteristics no longer satisfy the operating constraint, transfer the new instance to a second computing device associated with one or more additional operating characteristics that satisfy the operating constraint.

13. A computer-implemented method for profiling computing resource usage, the computer-implemented method comprising:
receiving, by a data center management component comprising one or more computing devices, a request for initialization of a software workload associated with an operating profile, wherein the operating profile is based at least in part on a plurality of historical operating metrics associated with one or more lifecycles of the software workload, and wherein the historical operating metrics vary over the one or more lifecycles of the software workload; and
in response to the request:
calculating, based at least in part on the plurality of historical operating metrics, one or more expected operating characteristics associated with the software workload, wherein the one or more expected operating characteristics vary over the one or more lifecycles of the software workload;
identifying a computing device of a plurality of computing devices based at least in part on the operating profile and the one or more expected operating characteristics associated with the software workload; and
causing the software workload to be initialized on the computing device.

14. The computer-implemented method of claim 13, wherein the software workload comprises a virtual machine instance, an operating system, a storage area network (SAN) node, or an application.

15. The computer-implemented method of claim 13, wherein at least one of the plurality of historical operating metrics relates to central processing unit (CPU) utilization, memory utilization, network utilization, hard disk utilization, or power utilization.

16. The computer-implemented method of claim 13 wherein at least one of the one or more operating characteristics comprises memory capacity, central processing unit (CPU) capacity, network bandwidth, network latency, position within a network topology, instruction set, or variance of a performance metric.

17. The computer-implemented method of claim 13, wherein the operating profile comprises a first expected resource usage amount associated with a first computing resource, wherein the first expected resource usage amount is based at least in part on a plurality of historical operating metrics regarding usage of the first resource, and wherein a characteristic of the one or more characteristic comprises availability of the first computing resource.

18. The computer-implemented method of claim 17, wherein each of the plurality of historical operating metrics regarding usage of the first resource is associated with a time that a measurement of usage was recorded, and wherein the operating profile is further based at least in part on the time that each of the plurality of historical operating metrics was recorded.

19. The computer-implemented method of claim 13, further comprising obtaining at least a portion of the plurality of historical operating metrics from an operation analysis component associated with either the software workload or a computing device of the plurality of computing devices executing the software workload.

20. The computer-implemented method of claim 13, further comprising determining the operating profile based at least in part on the plurality of historical operating metrics.

21. The computer-implemented method of claim 13, further comprising determining the operating profile based at least in part on a service level agreement with a customer associated with the software workload.

22. The computer-implemented method of claim 13, wherein the operating profile comprises a desired operating characteristic of the computing device.

23. The computer-implemented method of claim 22, wherein identifying the computing device is further based at least in part on determining that an operating characteristic of the one or more operating characteristics associated with the computing device corresponds to the desired operating characteristic.

24. The computer-implemented method of claim 22, further comprising:
receiving a current operating metric regarding operation of the software workload on the computing device, the substantially current operating metric related to the one or more operating characteristics; and
in response to determining, based on the substantially current operating metric, that none of the one or more operating characteristics associated with the computing device correspond to the desired operating characteristic, transferring the software workload to a second computing device associated with an operating characteristic corresponding to the desired operating characteristic.

25. The computer-implemented method of claim 13, wherein the operating profile comprises a first predefined operating profile of a plurality of predefined operating profiles.

26. The computer-implemented method of claim 25, wherein the predefined operating profiles are associated with levels in an operating hierarchy, and wherein the first predefined operating profile is associated with higher level, in relation to the software workload, of the operating hierarchy.

27. The computer-implemented method of claim 13, wherein the operating profile comprises a customer-specific operating profile, and wherein the plurality of historical operating metrics are associated with initialization or use of the software workload by the customer.

28. The computer-implemented method of claim 13, wherein the operating profile comprises a median, standard deviation, or usage histogram of a historical operating metric.

29. The computer-implemented method of claim 13, wherein the operating profile is based at least in part on historical operating metrics from a particular time period.

* * * * *